INVENTOR:
CHARLES R. WILLIAMS
BY Herbert E. Metcalf
HIS PATENT ATTORNEY

Patented Jan. 5, 1954 2,665,068

UNITED STATES PATENT OFFICE 2,665,068

ADD-SUBTRACT BINARY COUNTER CIRCUIT

Charles R. Williams, Hawthorne, Calif., assignor to Northrop Aircraft, Inc., Hawthorne, Calif., a corporation of California Application August 18, 1950, Serial No. 180,255

6 Claims. (Cl. 235—61)

The present invention relates to cold cathode tube flip-flop circuits adapted for use in binary counters, and is an improvement on the basic circuit shown, described and claimed in the copending Hagen application, Serial No. 100,178, filed June 20, 1949.

Essentially a flip-flop is a device which has two stable states and is capable of being triggered from one state to the other. A dual cold cathode gas flip-flop tube has two conducting stable states; either one cathode is conducting, or the other cathode is conducting. The tube is non-conducting only during relatively short transition times, and sufficient supply voltage is provided to insure refiring.

Circuits for use with dual cold cathode gas tubes to obtain flip-flop operation have the following elements in common:

1. A supply voltage source higher than the firing voltage of the tube.
2. A current limiting resistance in series with the supply voltage.
3. A cathode circuit such that in either stable state the "on" cathode is at a higher positive potential than the "off" cathode.
4. A means of coupling in a triggering pulse which decreases the voltage across the tube and extinguishes the glow current.
5. A means of maintaining the "on" to "off" cathode differential voltage during the triggering transition time.
6. A means of delaying the rise of the voltage across the tube during triggering to allow ionization dissipation before refiring.

These components are shown, described and claimed in the Hagen application cited above.

In a multi-stage binary counter each flip-flop stage must be triggered at exactly one-half the pulse repetition rate of the preceding stage.

One method of obtaining alternate carry pulses is to take them from the flip-flop cathodes in a suitable cathode circuit. Since the cathodes fire alternately, the one-half input rate is automatically obtained by viewing the output of only one of the cathodes.

The "on" and "off" states of a binary flip-flop may be arbitrarily assigned and may be indicated by some device such as a glow lamp which lights when the flip-flop is "on." Having assigned the "on" and "off" flip-flop states, then for additive binary counting a carry pulse must be emitted from a particular flip-flop stage each time that stage changes from "on" to "off." Conversely for subtractive counting a carry pulse must be emitted each time the stage changes from "off" to "on." Thus, if additive counting carry pulses are derived from one cathode, then subtractive counting pulses may be derived from the other cathode. If both additive and subtractive carry pulses are generated, then it is necessary to provide suitable gates which permit only one type or the other to pass at a given time.

It is an object of the present invention to provide a dual cold cathode tube circuit of the Hagen type, modified for binary counter use, to generate both add and subtract carry pulses.

It is another object of the present invention to provide a simple binary counting circuit using cold cathode glow tubes.

Briefly, the invention comprises a flip-flop circuit using a dual cold cathode glow tube, together with circuit means, for shifting the glow discharge from one cathode to the other under the control of input pulses. A carry pulse output circuit is provided which generates both add and subtract carry pulses for the next stage, and means are provided to block either type of carry pulse according to a control pulse input. Thus, when the flip-flop circuit of the present invention is used in a multistage binary counter, it will add or subtract the input pulse in accordance with a control pulse.

The invention will be more fully understood by reference to the accompanying drawings in which.

Figure 1:
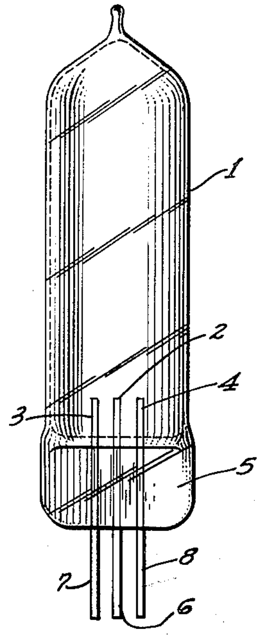
Figure 1 is a side view of a preferred form of cold cathode glow tube for use in the circuit of the present invention.
Figure 2:
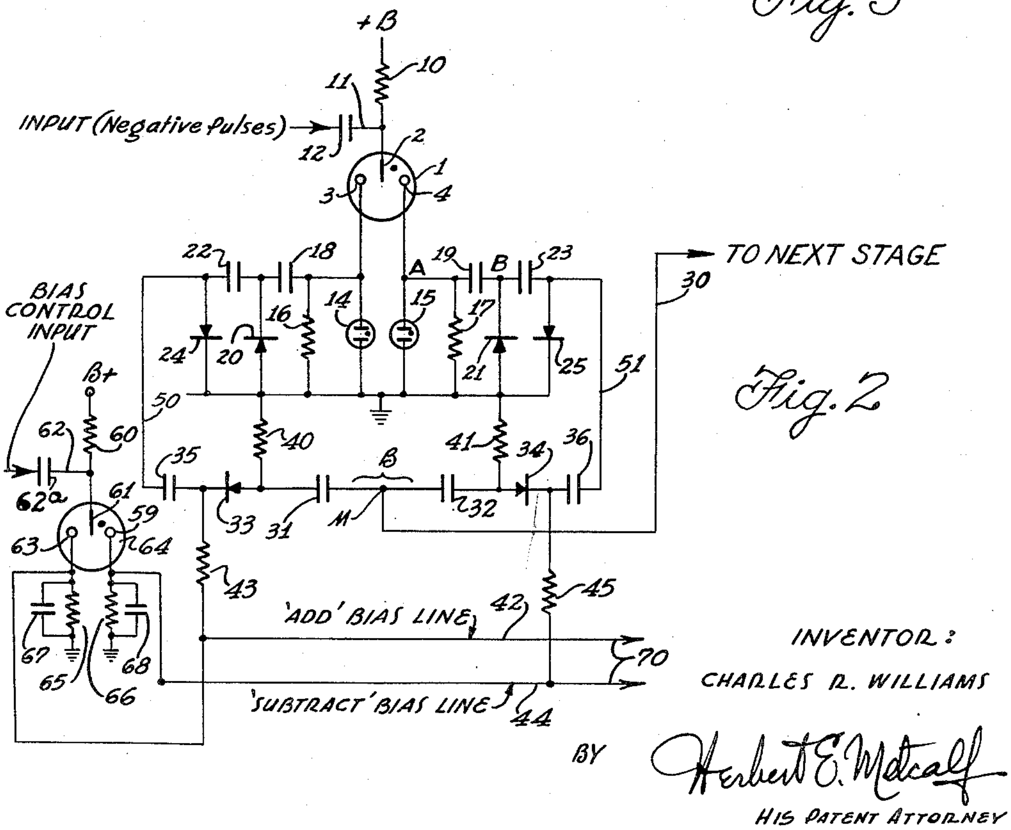
Figure 2 is a circular diagram illustrating the present invention in a preferred form.

As shown in Figure 1, the tube preferred for use in the circuits of Figure 2 is provided with an envelope 1 containing an anode wire 2, flanked on one side by a cathode wire 3 and flanked by a cathode wire 4 on the other side. These wires pass through an external pinch 5 to form an anode lead 6 and cathode leads 7 and 8, respectively.

A preferred tube is one inch long by $\frac{3}{16}$ inch inside diameter. The gas pressure in the tube and the anode to cathode spacing is adjusted to give a desirable firing to burning voltage differential. Electrode surface spacings of .030 inch in helium at 250 mm. Hg pressure are satisfactory, and cathode wires of .010 to .015 inch diameter and .1 inch long will satisfactorily carry up to 1.0 ma. current. Suitable tube currents for flip-flop operation range from 0.1 to 1.0 ma. Such a tube will provide useable "on" to "off" cathode differentials of from 50 to 150 volts. Burning voltages are about 150 to 200 volts and firing potentials are about 250 to 500 volts depending upon gas mixture, material, and condition of cathodes.

For long life and most dependable operation, I prefer that the tube have from one percent to five percent of a recombinable polyatomic gas therein, such as hydrogen or water vapor, for example, in addition to the noble gas filling, in accordance with the teachings of another copending Hagen et al. application, Serial No. 156,659, filed April 18, 1950. The anode area is not critical, and conduction usually occurs from relatively small area points on the anode surface. The anode is preferably placed centrally between the two cathodes to obtain symmetrical electrical characteristics and in the same plane with the cathodes for ease of manufacture.

For ease of illustration, the tube of Figure 1 is shown in Figure 2 with the anode entering the top of the tube. In Figure 2, anode 2 is connected to a source of positive potential +B through a limiting resistor 10, and is also connected to input line 11 having a series input capacity 12 therein. Pulses to be counted are fed into the circuit through input line 11.

Cathodes 3 and 4 are connected to ground through neon glow lamps 14 and 15, respectively, and through parallel cathode resistors 16 and 17, respectively.

Cathodes 3 and 4 are also connected to ground through differential capacitors 18 and 19, respectively, in series with shunt diodes 20 and 21, respectively.

Each respective junction of the differential capacitors 18 and 19, with their respective shunt diodes 20 and 21, is grounded through pulse inversion capacitors 22 and 23, respectively, in series with inversion diodes 24 and 25, respectively. The conduction direction of the shunt diodes and the inversion diodes are reversed.

A blocking network B is provided with a midpoint M to which an output line 30 is connected; this output line being connected to the input line 11 of a following stage similar in all respects to the counting portion of the circuit of Figure 2.

In order and in series outwardly, on the respective sides of midpoint M in the blocking network B, are output coupling capacitors 31 and 32, gate diodes 33 and 34, and output capacitors 35 and 36, the latter being connected to the respective cathodes 3 and 4 at the respective junctions of pulse inversion capacitors 22 and 23 and the inversion diodes 24 and 25.

An isolating resistor 40 is connected from ground to the junction between isolation capacitor 31 and gate diode 33, and a corresponding isolating resistance 41 is connected between isolation capacitor 32 and gate diode 34 to ground.

An add bias line 42 is provided for all stages, and is connected to the blocking network B on one side of the midpoint M between the output capacitor 35 and the gate diode 33 through an add line resistor 43. A subtract bias line 44 is provided, connected to the blocking network B on the other side of the midpoint M between the output capacitor 36 and the gate diode 34 through subtract line resistor 45.

In the operation of the circuit so far described, resistor 10 is the current limiting resistor. Cathode resistors 16 and 17, and capacitors 18 and 19 are used to maintain the differential voltage between cathodes 3 and 4 during the triggering transition times. Neon lamps 14 and 15 are used both to develop an output pulse, and to serve as indicators as to the conduction status of cathodes 3 and 4; it is to be noted that neon lamps 14 and 15 by virtue of their characteristic of requiring a relatively high firing potential (100 volts, for example) and of then returning to a substantially lower operating potential (50 volts, for example) effect a useful positive pulse output without which the circuit herein disclosed would be rendered effectively inoperative.

Shunt diodes 20 and 21 shunt out negative input pulses which would otherwise appear in the cathode circuits and act as carry pulses; shunt diodes 20 and 21 do not attenuate the desired positive pulses generated by the neon lamps 14 and 15. As these lamp-generated pulses are positive, the diode capacity combinations 24, 22 and 25, 23 are used as pulse inverters so that only negative pulses are passed to the blocking circuit B through pulse output lines 50 and 51.

Figure 3:
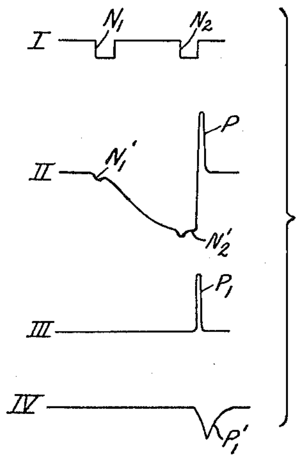
Figure 3 is a series of wave form diagrams illustrative of how a positive pulse generated by a neon lamp, for example, is inverted and conveyed on as a negative carry pulse.

Figure 3 comprises a series of waveform diagrams illustrating how negative pulses appearing at cathodes 3 or 4 are effectively shunted and hence do not appear on output lines 50 and 51 and how a positive pulse generated by neon lamp 14 or by neon lamp 15 is inverted and conveyed on as a negative carry pulse. For example, assume a train of pulses comprising waveform I is applied to input 11 (Figure 2) while conduction is taking place from anode 2 to cold cathode 4 of dual cold cathode gas tube 1. First negative input pulse $N_1$, cuts off conduction from anode 2 to cold cathode 4, it is during this time that negative pip $N_1'$ is effected in voltage level on cathode 4. $N_1'$ denotes an undesired negative pip which appears on cathode 4 as a result of capacitance coupling between the tube elements. Second negative input pulse $N_2$ cuts off conduction from anode 2 to cathode 3; cold cathode gas tube then refires, initiating conduction from anode 2 to cold cathode 4; it is at this time that a second undesired negative pipe $N_2'$ is effected in the voltage level on cathode 4. Rising voltage level on cathode 4 effects a rise in voltage across neon lamp 15 until a firing potential is attained; the voltage then drops sharply to a relatively constant operational voltage level thus effecting a positive pulse P as illustrated in waveform II which appears at A in Figure 2. The combination of capacitor 19 and diode 21 serves to differentiate and clip negative portion of waveform II, including negative pips $N_1'$ and $N_2'$, arising from capacitive coupling in input 11, thus waveform III appears at B (Figure 2); false carry pulses are therefore eliminated and only positive pulse P is applied to condenser 23 which, in conjunction with diode 25, forms a differentiating net-work. Diode 25 conducts during the rise of pulse $P_1$ of waveform III but blocks during the fall of pulse $P_1$ thus effecting negative spike $P_1'$ which appears on output line 51 i. e. waveform IV.

The foregoing discussion can be extended by similar analysis to conduction from anode 2 and to cold cathode 3.

In the blocking circuit B, isolating resistors 40 and 43, together with diode 33, act as one gate, and on the other side of the midpoint M isolating resistors 41 and 45, together with diode 34, act as the other gate.

These gates, when supplied with the proper positive bias potential, will block the negative output pulse appearing in pulse output lines 50 and 51. Thus, the blocking circuit B will pass an add or a subtract negative pulse into carry pulse line 30, in accordance with the application of a positive bias potential, to add bias line 42 or subtract bias line 44.

While there are many ways to apply the desired bias to bias lines 42 and 44, we prefer to utilize a simple flip-flop of the Hagen type to operate the bias lines 42 and 44 as further shown in Figure 2.

Here a Hagen type glow tube 59, similar to that shown in Figure 1, is connected in a flip-flop circuit in which a limiting resistor 60 is connected to the anode 61, and to a source of positive potential B+. A bias control input line 62 carrying negative pulses is also connected to anode 61.

Cathodes 63 and 64 of tube 59 are connected to ground by respective cathode resistors 65 and 66 bridged by cathode capacitors 67 and 68 respectively.

The add bias line 42 is connected to one cathode 63 and the subtract bias line 44 is connected to the other cathode 64.

As negative pulses appear in the bias control input line 62, via coupling capacitor 62a the glow discharge will flip from one cathode to the other. When the cathode connected to bias line 42 or 44 is not involved in the glow discharge, no bias appears on that line. However, when the cathode connected to bias line 42 or 44 is operating, a positive bias will be imposed on that bias line. As this positive bias will continue as long as the particular cathode is energized, the counter circuit carry pulse line 30 will pass carry pulses of add or subtract character in accordance with which cathode of glow tube 59 is involved in the discharge. Accordingly, pulses applied to glow tube 59 will control the output of the counter stage. As the add and subtract bias lines are connected to all of the counter stages, as indicated by bias line arrows 70, the entire counter will add or subtract pulses entering counter input line 11, in accordance with the condition of bias tube 59.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. In an add-subtract multi-stage binary counter, a flip-flop circuit stage including a tube comprising an envelope, a pair of cold cathodes and an intermediate anode in said envelope, a filling of gas at glow discharge pressure in said envelope, a limiting resistance, a source of potential higher than the firing potential of said tube connected between said anode and both of said cathodes in series with said limiting resistance, an input line connected to apply an input pulse to said anode, a two-electrode glow tube connecting each of said cathodes to the negative end of said potential source, an RC circuit connected to each of said cathodes, a pulse inversion circuit means coupled across the output of each of said cathodes, means for gating pulses generated at one of said cathodes, to obtain add carry pulses, and for gating pulses generated at the other of said cathodes, to obtain subtract carry pulses, for the next flip-flop stage.

2. Apparatus in accordance with claim 1 including a crystal diode shunting each of said cathodes to the negative end of said source, whereby negative pulses generated by said cathode circuits are prevented from passing to the output.

3. Apparatus in accordance with claim 1 wherein said pulse inversion means comprises a series capacitor and a rectifier across said cathode circuit.

4. Apparatus in accordance with claim 1 wherein said means for gating said output pulses comprises a crystal diode oriented in each of the outputs from said pulse inversion means to pass pulses therefrom, and means for applying a potential bias to said crystal diode to block pulses from passing to the output, said latter means including isolating resistors across said crystal diode.

5. In an add-subtract multi-stage binary counter, a flip-flop circuit stage including a tube comprising an envelope, a pair of cold cathodes and an intermediate anode in said envelope, a filling of gas at glow discharge pressure in said envelope, a limiting resistance, a source of potential higher than the firing potential of said tube connected between said anode and both of said cathodes in series with said limiting resistance, an input line connected to apply an input pulse to said anode, a cathode circuit for each of said cathodes comprising a two-electrode glow tube connecting said cathode to the negative end of said source, and an RC circuit, a pulse inversion circuit means coupled to each of said cathode circuits, a crystal diode coupled to each of said pulse inversion circuits, an add bias line, a subtract bias line, bias isolating resistors connecting said bias lines to the cathode ends of said crystal diodes, isolating resistors connecting the plate ends of said crystal diodes to the negative end of said source, a dual cold cathode control flip-flop, a bias control input line connected to apply pulses to trigger said control flip-flop, said add bias line connected to one cathode and said subtract line connected to the other cathode of said control flip-flop.

6. A plurality of flip-flop circuits stages as recited in claim 5 wherein said add and subtract bias lines are similarly connected to each of said stages, whereby, dependent on the state of said control flip-flop, all of the stages carry pulses generated on one or the other of said cathodes.

CHARLES R. WILLIAMS.

References Cited in the file of this patent

UNITED STATES PATENTS

| Number | Name | Date |
|---|---|---|
| 2,462,275 | Morton et al. | Feb. 22, 1949 |
| 2,537,427 | Seid et al. | Jan. 9, 1951 |

OTHER REFERENCES

"The Binary Quantizer," Barney, Electrical Engineering, November 1949; pages 962–967.